United States Patent [19]

Hormadaly et al.

[11] Patent Number: 5,137,851
[45] Date of Patent: Aug. 11, 1992

[54] ENCAPSULANT COMPOSITION

[75] Inventors: Jacob Hormadaly, Wilmington, Del.; Barry E. Taylor, Tokyo, Japan

[73] Assignee: E. I. Du Pont de Nemours and Company, Wilmington, Del.

[21] Appl. No.: 714,223

[22] Filed: Jun. 11, 1991

[51] Int. Cl.$^5$ .............................................. C03C 3/074
[52] U.S. Cl. ........................................ 501/76; 501/10; 501/20
[58] Field of Search ........................... 501/76, 20, 10

[56] References Cited

U.S. PATENT DOCUMENTS

| | | | |
|---|---|---|---|
| 3,088,835 | 5/1963 | Pirooz | 501/76 |
| 3,113,878 | 12/1963 | Martin | 501/5 |
| 3,959,543 | 5/1976 | Ellis | 106/53 |
| 3,973,975 | 8/1976 | Francel et al. | 501/76 |
| 4,824,809 | 4/1989 | Grabowski et al. | 501/76 |

FOREIGN PATENT DOCUMENTS 52-154825  6/1976  Japan .

*Primary Examiner*—Mark L. Bell
*Assistant Examiner*—Deborah Jones

[57] ABSTRACT

A crystallizable glass composition comprising PbO and/or $Bi_2O_3$, ZnO, $B_2O_3$, $Cr_2O_3$, $SnO_2$ and optionally $SiO_2$ and/or $Al_2O_3$, having an optical density parameter $\geq 1.6$.

5 Claims, No Drawings

ENCAPSULANT COMPOSITION

FIELD OF INVENTION

The invention relates to encapsulant compositions. In particular, the invention relates to low melting glass compositions which are suitable for use as encapsulants for electronic circuits.

BACKGROUND OF THE INVENTION

Hybrid circuits should be encapsulated to insure resistor durability in humid atmospheres. Furthermore, manufacturers prefer glass encapsulation to protect the conductor metals from long term corrosion.

The encapsulant system must exhibit several features which are difficult to achieve together. It must form a bubble-free seal at low enough firing temperature and prevent shift of the underlying resistors. If the glass flows too much, it will diffuse into the resistor and shift the value upward. If it does not flow enough, it will not seal. The organic vehicle necessary for screen printing must burn out at this low temperature. Thus an ideal encapsulant should screen print smoothly and rapidly with a vehicle which is decomposable at a low enough temperature to allow the glass to flow sufficiently to form a seal, but not so much as to shift the resistor.

Various glasses having low glass transition temperature (Tg) have been used extensively as encapsulants for electronic circuits. These glasses usually have had a high Temperature Coefficient of Expansion (TCE) which, unless it is carefully matched to the adjacent circuit layers, can set up substantial mechanical stresses which can lead to system failures.

An encapsulant, among its other functions, provides protection from the environments to the underlying electronic circuit. To fulfill this function the encapsulant should have sufficient durability to survive the environments encountered in the production and the daily use of the electronic circuits. Most low softening point glasses (referred to here as "low melting glasses") have poor durability in acids and bases and their durability tends to degrade as the glass transition temperature (Tg) becomes lower. Although the majority of electronic circuits are not expected to be used in very acidic or basic environments, some are exposed to water and basic or acidic environments during the production. The final stage in some fabrication processes involves an additional encapsulation by an organic polymer, e.g., an epoxy. Some epoxy resins contain an amine which can exert basic environment in humid atmosphere. Therefore, durabilities in boiling water and basic solutions [triethanolamine (TEA), in water to simulate amines in epoxy] are detailed here.

To combat this problem, a glass has been suggested by Asahi Glass KK in JPA 52/154825, which is a crystallizable zinc-lead-borate type glass that undergoes crystallization when it is fired at 540°-560° C. and produces a crystallized overlay having a low TCE. Although the glass forms a dense overlay when fired at 540° C., the layer tends to be porous because of insufficient flow of the vitreous phase and excessive crystallization. It is, of course, desirable to be able to fire at a temperature in the 510°-560° C. range in order to avoid interaction of the glass with the underlying circuit components during the firing cycle. Therefore, there remains a real need for an encapsulating glass which (1) can be fired in the 510°-560° C. range to form a dense overlay, and (2) will form a dense overlay having good encapsulating properties.

SUMMARY OF THE INVENTION

The invention is therefore directed primarily to a crystallizable glass which is suitable as an encapsulant for silver conductive circuits consisting essentially by weight of 30-40% PbO, $Bi_2O_3$ or mixtures thereof, 35-50% ZnO, 10-30% $B_2O_3$, 0.5-3% $Cr_2O_3$, 0.5-10% $SiO_2$, $SnO_2$ or mixtures and 0-10% $Al_2O_3$, the optical density parameter of the glass being at least 1.6.

In a second aspect, the invention is directed to thick film pastes which are dispersions of the above-described glass in an organic medium.

In a third aspect, the invention is directed to a method for encapsulating resistors comprising the sequential steps of:

(1) forming a resistor on an electrically non-conductive substrate by applying to the substrate a pattern of thick film resistor paste comprising finely divided particles of resistive conductor material and inorganic binder dispersed in organic medium and firing the patterned paste to effect volatilization of the organic medium and sintering of the inorganic binder; and (2) completely covering the fired resistor pattern with a layer of the above-described encapsulant thick film paste and firing the thick film paste to effect volatilization of the organic medium and sintering of the glass.

PRIOR ART

The closest prior art of which applicant is aware at the time of filing this application is the following:

U.S. Pat. No. 3,088,835, Pirooz—The Pirooz patent is directed to a crystallizable sealing glass composition containing 38-42% ZnO, 10-14% $SiO_2$, 11-29% wt. PbO, 9-13% copper oxide, and up to 5% wt. of other glass forming oxides such as $B_2O_3$. The copper oxide is indicated to be essential for the purpose of adjusting the temperature coefficient of expansion of the composition.

U.S. Pat. No. 3,113,878, Martin—The Martin patent is directed to a crystallizable zinc silicoborate glass consisting of 60-70% ZnO, 19-25% $B_2O_3$ and 10-16% $SiO_2$ and optionally "minor amounts" of glass forming materials such as PbO, $As_2O_3$ and $Sb_2O_3$ and colorants. In particular, a glass is disclosed containing 60% ZnO, 22.5% $B_2O_3$, 12.5% $SiO_2$ and 5% PbO (Example 7). The glass is disclosed to be useful as a sealing glass for preformed materials having a Temperature Coefficient of Expansion (TCE) of $30-50 \times 10^{-7}$.

Japanese Kokai 61/6018, assigned to Asahi Glass—The patent is directed to a crystalline glass having a low melting point with the following composition by weight: 31-40% PbO, 35-50% ZnO, 10-20% $B_2O_3$, 2-6% $SiO_2$, 0-3% $SnO_2$ and 0-4% $TiO_2$. The glass is completely crystallized within 30 minutes upon heating to 500°-600° C. The crystallized product has a TCE of $43-55 \times 10^{-7}$ per ° C. The glass is disclosed to be useful as a cover for thick film circuits. It is disclosed to be applied as a paste by printing or brushing.

DETAILED DESCRIPTION OF THE INVENTION

Because the encapsulant composition of the invention is used with fired resistors, it is necessary that the glass component be fired at a relatively low temperature such that the glass will incur only a minimum amount of diffusion into the resistor structure thereby minimizing interaction with the resistor. Thus the glass component of the encapsulant composition of the invention has been designed for use at a firing temperature of about 530°-580° C.

It has been found that complete crystallization of a separate phase throughout the encapsulated mass is not necessary. It is necessary only that crystallization take place at the interface of the fired resistor and the encapsulant layer in order to minimize glass flow at the interface. The crystallized glass phase has been determined to be a mixture of $PbZn_2B_2O_6$, $Zn_2SnO_4$, $ZnSnO_3$ and $Zn_2SiO_4$, of which the $PbZn_2B_2O_6$ is the major component. The crystallized glass has a different composition than both the parent glass (or glasses) and the remainder glass.

The composition of the invention is required to contain by weight at least 35% ZnO, but not more than 50%. If less than 35% ZnO is used, the composition will not crystallize sufficiently and the TCE is too high. On the other hand, if more than 50% ZnO is used, the amount of crystallization upon firing at 530°-580° C. is excessive. It is preferred that the ZnO be present within the range of 35-45%.

In the practice of the invention, PbO and $Bi_2O_3$ may be used interchangeably. That is, either may be used to the exclusion of the other, or both may be used together in all proportions. The $PbO/Bi_2O_3$ must be present in the composition of the invention in an amount of at least 30% but not more than 40%. If less than 31% PbO/$Bi_2O_3$ is used, the TCE of the glass is too high and the softening point of the glass becomes too low. It is preferred that the $PbO/Bi_2O_3$ be present in the glass within the range of 35-40%.

The $B_2O_3$ component is contained in the glass of the invention in amounts ranging from 10-30% by weight. The $B_2O_3$ serves an important function in the glass in that contributes significantly to the durability of the encapsulant layer. However, if more than 30% $B_2O_3$ is used, the TCE of the composition tends to become too high. On the other hand, if less than 10% $B_2O_3$ is used, the degree of crystallization during firing at 510°-560° C. tends to become excessive. It is preferred that the $B_2O_3$ be used within the range of 10-18% by weight.

When low melting glasses or encapsulants are applied onto silver bearing conductors, e.g., pure silver, silver platinum and silver palladium, and processed in the conveyor furnace, they form a colored area above the conductor. The color ranges from light yellow to brown depending on the glass and conductor composition and processing conditions. Colored or stained areas probably arise from the dissolution of silver in the glass and subsequent precipitation of metallic silver during the processing. Stain formation is a cosmetic defect which circuit manufacturers prefer to minimize to the extent possible.

In order that the glasses of the invention may be stain-free when they are used to encapsulate silver-containing conductor systems, it is necessary to use at least 0.1% $Cr_2O_3$ in the glass. However, it is preferred not to use more than 3% $Cr_2O_3$ lest the presence of $Cr^{6+}$ ions in the composition deteriorate the physical properties of the glass excessively. As used herein, the term "stain-free glass" refers to a glass which, when used as the inorganic phase in an encapsulant for thick film silver-containing conductive layers which have been fired at 530°-580° C. results in the insulative layer's having a natural green color. This is in contrast to stained glasses which have a brown silver stain.

In order for the chromium oxide to be effective to reduce staining, it has been found that it must be present in the glass in an oxidized state whereby the Optical Density Parameter of the glass (f) is at least 1.6 and preferably in the range of 2-3.5. To accomplish this, it is necessary that the ratio of $Cr6+$ to $Cr3+$ be sufficiently high. This ratio is most readily adjusted by melting the glass under oxidizing conditions whereby the amount of $Cr6+$ is kept high with respect to the amount of $Cr3+$. This is best accomplished during the glass melting process by bubbling air through the melt.

As used herein, the term "Optical Density Parameter" (f) refers to the ratio of the band absorption of the glass at 600 nm to the band absorption at 400 nm as calculated from a diffused reflectance spectra (DRS) of the glass under consideration. This measurement is discussed in greater detail hereinbelow.

Both the $SiO_2$ and $SnO_2$ are important in the composition of the invention because of their contribution to the durability (insolubility and hermeticity) of the glass. At least 0.5 of each must be used in order to get any significant technical effect. However, in order to avoid making the softening point of the glass too high, the total amount of $SiO_2$ and $SnO_2$ must not exceed 10% and the amount of $SnO_2$ must not exceed 10%. It is preferred that both the $SiO_2$ and $SnO_2$ be present within the composition of the invention within the range of 1-8%.

In addition to the above-described essential components, the composition may optionally contain up to 5% by weight $Al_2O_3$. Small amounts of $Al_2O_3$ are added to facilitate glass formation when the glass is synthesized.

The surface area of the glass is not critical but is preferably in the range of 0.75-4 $m^2/g$. Assuming a density of approximately 3-4 $g/cm^2$, this range corresponds to an approximate particle size range of 0.5-1 micron. A surface area of 1.5 $m^2/g$ (approx. 1.3 micron) can also be utilized. The preparation of such glass frits is well known and consists, for example, in melting together the constituents of the glass in the form of the oxides of the constitutents and pouring such molten composition into water to form the frit. The batch ingredients may, of course, be any compound that will yield the desired oxides under the usual conditions of frit production. For example, boric oxide will be obtained from boric acid, silicon dioxide will be produced from flint, zinc oxide will be produced from zinc carbonate, etc. The glass is preferably milled in a ball mill with water to reduce the particle size of the frit and to obtain a frit of substantially uniform size.

The glasses of the invention are made by conventional glassmaking techniques in that they are prepared by mixing the several metal oxide components, heating the mixture to form a melt, forming a frit from the melt by quenching in cold water and milling the frit to adjust the particle size of the resulting glass powder. However, the process for making these particular glasses is unconventional in two respects: (1) it is necessary for the reasons discussed hereinabove to conduct the melting step under oxidative conditions; and (2) it has been found to be necessary to ball mill the frit.

As previously mentioned, to melt the admixture of metal oxides oxidatively is readily accomplished by bubbling air through the molten mixture of oxides which facilitates the formation of hexavalent chromium species. As is well known in the art, heating is conducted to a peak temperature and for a time such that the melt becomes entirely liquid and homogeneous. In the present work, the components are premixed by shaking in a polyethylene jar with plastic balls and then melted in a platinum crucible at the desired temperature.

The melt is heated at the peak temperature for a period of 1½ hours. The melt is then poured into cold water. The maximum temperature of the water during quenching is kept as low as possible by increasing the volume of water to melt ratio. The crude frit after separation from water is freed from residual water by drying in air or by displacing the water by rinsing with methanol. The crude frit is then ball milled in water for 3-24 hours in alumina containers using alumina balls.

After discharging the milled frit slurry, excess solvent is removed by decantation and the frit powder is air dried at room temperature. The dried powder is then screened through a 325-mesh screen to remove any large particles.

There are today two principal ways of size reducing glass frits—ball milling and jet milling. In the former, the grinding action is carried out by inert ceramic balls. In the latter, the grinding action is carried out by impingement of the frit particles in a high velocity stream. Both are widely used, and each is ordinarily considered to be a suitable alternative to the other. It is, however, an unusual characteristic of the glasses of the invention that they perform best when they are wet ball milled, rather than when they are jet milled. In particular, it has been found that the glasses of the invention have reduced tendency to form blisters upon firing over conductive circuits when they are wet ball milled. The preferred milling medium is alumina balls. This unusual phenomenon can be observed from the data given in Table 1.

Is is preferred that the encapsulant glass compositions of the invention contain only the metal oxides discussed hereinabove. Nevertheless, it is recognized that small amounts, up to 5% wt., of other glass modifying oxides such as alkali metal oxides and alkaline earths can be added to the encapsulant compositions without changing their essential character.

ORGANIC MEDIUM

Organic medium suitable for use in the invention are selected according to the physical form in which the encapsulant compositions are applied. In particular, the encapsulant glass frit can be applied as a thick film paste by screen printing.

When the encapsulant is applied by screen printing, the particles thereof are mixed with an inert liquid medium (vehicle) by mechanical mixing (e.g., on a roll mill) to form a pastelike composition having suitable consistency and rheology for screen printing. The latter is printed as a "thick film" in the conventional manner.

The main purpose of the organic medium is to serve as a vehicle for dispersion of the finely divided solids of the composition in such form that it can readily be applied to ceramic or other substrates. Thus the organic medium must first of all be one in which the solids are dispersible with an adequate degree of stability. Secondly, the rheological properties of the organic medium must be such that they lend good application properties to the dispersion.

Most thick film compositions are applied to a substrate by means of screen printing. Therefore, they must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling and good firing properties. Satisfactory appearance of the fired composition is also important.

In view of all these criteria, a wide variety of liquids can be used as organic medium. The organic medium for most thick film compositions is typically a solution of resin in a solvent frequently also containing thixotropic agents and wetting agents. The solvents usually boil within the range of 130°-350° C.

Suitable solvents include kerosene, mineral spirits, dibutylphthalate, butyl carbitol, butyl carbitol acetate, hexylene glycol and high boiling alcohols and alcohol esters. Various combinations of these and other solvents are formulated to obtain the desired viscosity and volatility.

By far the most frequently used and a frequently preferred resin for this purpose is ethyl cellulose. However, resins such as ethylhydroxyethyl cellulose, wood rosin, mixtures of ethyl cellulose and phenolic resins, polymethacrylates of lower alcohols and monobutyl ether of ethylene glycol monoacetate can also be used.

In the past, poly(alpha-methyl styrene) has been utilized as a resin for thick film applications because of its excellent burn-out properties. However, poly(alpha-methyl styrene) has not been widely used because thick film pastes made therewith have exhibited very poor rheological properties. It has, however, been found when the encapsulant composition of the invention are formulated as thick film pastes using poly(alpha-methyl styrene) dissolved in dibutyl carbitol, the resulting paste has quite good rheological properties for screen printing. Thus, a further suitable organic medium for formulating the encapsulant composition of the invention as a thick film paste is a solution of 20-60% wt. poly(alpha-methyl styrene) and 80-40% wt. dibutyl carbitol and preferably 45-55% wt. poly(alpha-methyl styrene) and 55-45% wt. dibutyl carbitol.

Among the thixotropic agents which are commonly used as hydrogenated castor oil and derivatives thereof and ethyl cellulose. It is, of course, not always necessary to incorporate a thixotropic agent since the solvent resin properties coupled with the shear thinning inherent in any suspension may alone be suitable in this regard. Suitable wetting agents include phosphate esters and soya lecithin.

The ratio of organic medium to solids in the paste dispersions can vary considerably and depends upon the manner in which the dispersion is to be applied and the kind of organic medium used. Normally, to achieve good coverage, the dispersions will contain complementally by weight 40-90% solids and 60-10% organic medium.

The pastes are conveniently prepared on medium (vehicle) utilized is determined mainly by the final desired formulation viscosity and print thickness.

TEST PROCEDURES

Laser Trim Stability—Laser trimming of thick film resistors is an important technique for the production of hybrid microelectronic circuits. ([A discussion can be found in *Thick Film Hybrid Microcircuit Technology* by D. W. Hamer and J. V. Biggers (Wiley, 19072, p. 173 ff.] Its use can be understood by considering that the resistances of a particular resistor printed with the same resistive ink on a group of substrates has a Gussian-like distribution. To make all the resistors have the same design value for proper circuit performance, a laser is used to trim resistances up by removing (vaporizing) a small portion of the resistor material. The stability of the trimmed resistor is then a measure of the fractional change in resistance that occurs after laser trimming. Low resistance change—high stability—is necessary so that the resistance remains close to its design value for proper circuit performance.

Shift on Aging at 150° C.—After initial measurement of resistance at room temperature, the resistor is placed into a heating cabinet at 150° C. in dry air and held at that temperature for a specified time (usually 1,000 hours). At the end of the specified time, the resistor is removed and allowed to cool to room temperature. The resistance is again measured and the change in resistance calculated by comparison with the initial resistance measurement.

Hermeticity—This test is performed in the same manner as the preceding Shift on Aging Test, except that the air within the heating cabinet is maintained at 85% relative humidity (RH) at 85° C. (85% RH/85° C.).

Resistance Measurement and Calculations—The test substrates are mounted on terminal posts within a controlled temperature chamber and electrically connected to a digital ohm-meter. The temperature in the chamber is adjusted and allowed to equilibrate, after which the resistance of the test resistor on each substrate is measured and recorded.

Silver Migration Resistance Test—The following procedure is used to test the compositions of the invention with respect to their capability to resist silver migration:

1. A series of parallel thick film silver conductor lines is printed on a 96% $Al_2O_3$ substrate using a 325-mesh screen having 1.1 mil wire. The conductor pattern is then fired.
2. An overglaze strip is printed over the conductor lines substrate using a 200-mesh screen having 1.6 mil wire. The patterned overglaze paste is fired at 500°–600° C. using a short 20-30 minutes firing cycle.
3. A drop of deionized water is placed on the fired overglaze between the conductor lines and a 20 volt DC current is applied for 15 minutes.
4. After applying current for 15 minutes, the assembly is examined under a microscope and examined visually. If any interaction is observed such as bubbles, staining or dendrite formation, the assembly is deemed to have failed the test, which is then terminated.

The above test is based upon procedures described by S. J. Krumbein in his article entitled Metallic Electromigration Phenomena in IEEE Transactions on Components, Hybrids and Manufacturing Technology, Vol. II, No. 1, March 1988.

Durability was measured as follows: Weighed 1×1 inch alumina substrates were screen printed with the desired overglaze, dried and subsequently fired at 560° C. peak temperature in a belt furnace. The fired part is then weighed again to record the net weight of the overglaze, after which it is subjected to boiling water for 5 hrs. or 1.49% TEA for 24 hrs. at room temperature (25 grams of 1.49% TEA solution were used for each 1×1 substrate, 50 g of distilled water were used for each 1×1 substrate in the boiling water test). After exposure to the test solution, the parts were rinsed with distilled water and dried in oven 120° C.±10° C. for ~16 hrs. Weights were recorded again to determine weight loss ($\Delta W$). All weight measurements were done on an analytical balance ±0.0001 g accuracy, so the accuracy in the measured $\Delta W$ is ±0.0003 g. Durability in boiling water for hours is outstanding for all compositions measured (Table I). Weight loss ranges were from 0.0001 g to 0.0005 g which is within experimental error. Durability in 1.49% TEA solution is given below.

Diffuse Reflectance Spectra—Cr-containing glasses tend to reach an equilibrium during the melting. The ratio of Cr(VI)/Cr(III) varies with temperature, melting time, glass composition and the oxidizing or reducing conditions during the melting. Cr(III)-Cr(VI) equilibrium in binary alkali silicate[1], UV absorption of binary borate containing Cr(VI)[2] and the UV absorption of Cr(VI) in binary and ternary alkali and alkaline earth borates[3] were reported in the literature. Literature data show that Cr(VI) in ternary borate glasses exhibits two intense absorption bands in the UV: one at 250-270 nm and the second at 350-370 nm. These bands are similar to the absorptions of solutions containing CrO4= (basic) and dichromate (acidic) species. Cr(III) absorption in glasses is similar to its absorption in solution, i.e., two weak bands in the visible ~440 nm and ~600 nm.

[1] P. Nash & R. W. Douglas, Phy. Chem. Glasses 6 (6), 197 (1965).
[2] A. Paul & R. W. Douglas, Phy. Chem. Glasses 8 (4), 151 (1967).
[3] A. Paul & R. W. Douglas, Phy. Chem. Glasses 9 (1), 27 (1968).

The glass of the invention does not lend itself to a simple absorption study because it is a crystallizable glass and has strong absorption in the UV due to the allowed transitions of $Pb^{+2}$. These transitions will mask some of the absorption bands of Cr(VI). These features do not allow quantitative estimation of Cr(VI) by UV-Vis absorption.

Diffused reflectance spectra were obtained for various glasses of the invention and similar Cr-free glass. Diffused reflectance spectra is basically a qualitative tool when comparing various samples. Analysis of the spectra shows that one can define a pure number-ratio of two absorption bands, which is proportional to Cr(IV)/Cr(III) ratio, thus facilitating correlation between meltings parameters and diffuse absorption spectra.

The absorption of band at ~600 nm is due to Cr(III) only, while the absorption band at 440 nm is due to Cr(III) and Cr(VI). If we denote the optical density at 600 nm as $D(\lambda_2)$ and the optical density at 440 nm as $D(\lambda_1)$ then:

$$D(\lambda_1) = \alpha \, [Cr(III)]$$
and
$$D(\lambda_2) = \alpha'[Cr(III)] + \beta[Cr(VI)]$$
then:

$$f = \frac{D(\lambda_2)}{D(\lambda_1)} = \frac{\alpha'}{\alpha} + \frac{\beta}{\alpha} \frac{[Cr(VI)]}{[Cr(III)]}$$

where $\alpha$, $\alpha'$ and $\beta$ are constants related to the specific absorption bands of Cr(III) and Cr(VI).

The ratio $f$ is directly related to [Cr(VI)]/[Cr(III)] ratio; by this analysis we have a quantitative parameter to compare sample to sample and to relate this parameter ($f$) to the melting conditions. More information is possible by using $\alpha$, $\alpha'$ and $\beta$ from the literature data.

The parameter $f$ was calculated from the diffuse reflectance spectra for glasses of the invention melted under various conditions. The error in the $f$ values is ±0.1.

EXAMPLES

Examples 1-18

A series of 18 glasses having the same composition of metal oxides was prepared in different ways in which the following variables were studied: crucible material, melting time and temperature, ball milling v. jet milling, and oxidative conditions. Each of the glasses was formulated into a thick film paste using as organic medium a solution of ethyl cellulose in terpineols. Each of the pastes was then screen printed and fired at 560° C. over a previously fired pattern of conductive thick film paste in which the conductive phase was a silver-containing metal (Ag, Ag/Pd, Ag/Pt). The composition by weight of the starting metal oxides in the glass was as follows:

| | |
|---|---|
| 38.2% | ZnO |
| 38.3% | Pb |
| 17.2% | $B_2O_3$ |
| 1.2% | $Cr_2O_3$ |
| 2.9% | $SnO_2$ |
| 2.3% | $SiO_2$ |

The melting conditions and properties of the glasses are given in Table 1 below:

TABLE 1

Effect of Glass Processing Conditions

| Example | Crucible Materials | Melt Conditions | Milling | f | Blistering |
|---|---|---|---|---|---|
| 1 | Pt | No bubbler tube. | Ball | 1.49 | No |
| 2 | Pt | Bubbler tube, 70 min. | Jet | 2.13 | Yes |
| 3 | Pt | Bubbler tube, 70 min. | Ball | 2.10 | No |
| 4 | Pt | Bubbler tube, 30 min., 1000° C. | Jet | 1.79 | Yes |
| 5 | Pt | Bubbler tube, 30 min., 1000° C. | Ball | 1.79 | No |
| 6 | Pt | Bubbler tube, 30 min., 800° C. 30 min., 1000° C. | Jet | 1.75 | Yes |
| 7 | Pt | Bubbler tube, 30 min., 800° C. 30 min., 1000° C. | Ball | 1.73 | No |
| 8 | Pt | Plant Scale, bubbler tube, 30 min., 1000° C. | Jet | 2.31 | Yes |
| 9 | Kyanite | $O_2$ from $Pb_3O_4$ decomposition 60 min. at 500° C. 60 min. at 1000° C. | Ball | 3.26 | No |
| 10 | Kyanite | $O_2$ from $Pb_3O_4$ decomposition 60 min. at 500° C. 60 min at 1000° C. | Ball | 3.10 | No |
| 11 | Kyanite | $O_2$ from $Pb_3O_4$ decomposition 60 min. at 500° C. 60 min. at 1000° C. | Ball | 3.21 | No |
| 12 | Pt | Bubbler tube, 70 min., 1000° C. | Ball | 2.03 | No |
| 13 | Pt | Bubbler tube, 20 min., 1000° C. | Ball | 1.83 | No |
| 14 | Pt | Bubbler tube, 30 min., 1000° C. | Ball | 2.04 | No |
| 15 | Pt | Bubbler tube, 40 min., 1000° C. | Ball | 2.25 | No |
| 16 | Pt | Bubbler tube, 50 min., 1000° C. | Ball | 1.68 | No |
| 17 | Pt | Bubbler tube, 60 min., 1000° C. | Ball | 1.76 | No |
| 18 | Pt | Bubbler tube, 70 min., 1000° C. | Ball | 1.97 | No |

The above data show that the use of oxidative melting conditions is effective to raise the optical density parameter of the glasses of the invention and that the use of ball milling in place of jet milling is effective in eliminating blistering of the encapsulant layers made from these glasses by firing the printed thick films.

In the foregoing examples, the bubbling rate was controlled and was the same for Examples 2-7 and 12-18. Example 8 was controlled at a higher bubble rate.

Examples 19-23

When the glass of Examples 1-18 was tested as to durability, the results were as follows:

TABLE 2

Glass Durability

| Example No. | Test Medium | Time (hrs.) | Avg. Wt. Loss Loss (% Wt.) | Temp. (°C.) |
|---|---|---|---|---|
| 19 | Boiling H2O | 5 | 1.0 | 100 |
| 20 | 0.1N NaOH | 1 | 4.2 | 22 |
| 21 | 0.001N NaOH | 1 | None | 22 |
| 22 | 1.5% wt. TEA | 24 | 6.5 | 22 |

Four lots of glass having the same composition as Examples 19-22 were tested as to TCE. All were found to have a TCE of $57$-$60 \times 10$-$7$/°C. When the preceding four glasses were used to encapsulate a silver conductor, it was found after 15 minutes that none of the encapsulant layers had bubbles, there was no dendrite formation and there was no staining of the encapsulant glass.

We claim:

1. A low melting crystallizable glass consisting essentially by weight of 30-40% PbO, $Bi_2O_3$ or mixtures thereof, 35-50% ZnO, 10-30% $B_2O_3$, 0.5-3% chromium oxide, 0.5-10% $SnO_2$, 0.5-10% $SiO_2$ and 0-10% $Al_2O_3$, the ratio of $Cr^{6+}$ to $Cr^{3+}$ in the chromium oxide being sufficient that the optical density parameter of the glass is at least 1.6.

2. The composition of claim 1 which contains 35-42% ZnO.

3. The composition of claim 1 which contains 35-40% PbO, $Bi_2O_3$ or mixtures thereof.

4. The composition of claim 1 which contains 14-25% $B_2O_3$.

5. A thick film composition comprising finely divided particles of the glass composition of claim 1 dispersed in an organic medium comprising a solution of organic polymer in nonvolatile solvent.

* * * * *